United States Patent [19]

Vacchiano et al.

[11] E Patent Number: Re. 33,753

[45] Reissued Date of Patent: Nov. 26, 1991

[54] AUSTENITIC STEEL WITH IMPROVED HIGH-TEMPERATURE STRENGTH AND CORROSION RESISTANCE

[75] Inventors: Sergio Vacchiano, Rome; Giovanni Lanfranco, St. Vincent; Roberto Gubiotti, Terni, all of Italy

[73] Assignee: Centro Sviluppo Materiali S.p.A., Rome, Italy

[21] Appl. No.: 459,304

[22] Filed: Dec. 29, 1989

Related U.S. Patent Documents

Reissue of:

[64] Patent No.: 4,824,636
Issued: Apr. 25, 1989
Appl. No.: 22,204
Filed: Mar. 5, 1987

[30] Foreign Application Priority Data

Mar. 17, 1986 [IT] Italy ..... 47782 A/86

[51] Int. Cl.[5] ..... C22C 38/44

[52] U.S. Cl. ..... 420/47; 420/57; 420/59

[58] Field of Search ..... 420/46, 47, 65, 66, 420/57, 59

[56] References Cited

U.S. PATENT DOCUMENTS 3,561,953 2/1971 Niimi et al. ..... 420/41
3,969,109 7/1976 Tanczyn ..... 420/65

FOREIGN PATENT DOCUMENTS 55-2775 1/1980 Japan ..... 420/47

*Primary Examiner*—Deborah Yee
*Attorney, Agent, or Firm*—Young & Thompson

[57] ABSTRACT

Austenitic steel with improved high-temperature strength and corrosion resistance, characterized by the simultaneous presence, in defined quantities, of Nb, Mo and V and by the presence of C and N in a specific ratio with said three elements.

2 Claims, No Drawings

AUSTENITIC STEEL WITH IMPROVED HIGH-TEMPERATURE STRENGTH AND CORROSION RESISTANCE

Matter enclosed in heavy brackets [ ] appears in the original patent but forms no part of this reissue specification; matter printed in italics indicates the additions made by reissue.

DESCRIPTION

The object of this invention is an austenitic steel with improved high temperature strength and corrosion resistance. Austenitic steels are known either characterized by very low Ni contents (not exceeding 2% by weight)—as described in GB Patent 1 108 384 —or containing no Ni at all (GB 834 218). However, such steels show poor high-temperature properties, because of a certain amount of hot brittleness, but especially because of their low resistance to high temperature oxidation and sulphidation. Also steels are known having a high Ni content (between 2 and 10% by weight), such as commercially available EMS 235 which, though having better oxidation and sulphidation resistance than those mentioned above, have poor high-temperature creep performance.

Improvements of such properties have been obtained modifying the above alloys by the addition of further elements such as Mo or W or others, for instance Pertinent in this respect is U.S. Pat. No. 3,969,109 which claims a steel composition basically containing C, Mn, Cr, Ni and N, to which at least one or more of the following elements can be added, if necessary: Mo up to 4% by weight, W up to 3% by weight and Nb and/or V up to 2% by weight.

However, of the alloys examined in that patent, those with the best properties contain none of said optional elements. Moreover the one alloy examined containing more than one of these elements is inferior to others as regards high-temperature oxidation and sulphidation performance.

Moreover, none of said modified steels can ensure long-term constancy of strength and corrosion resistance, especially at temperature in excess of 450° C., since formation of $\sigma$ phase is possible, which increases hardness and wear resistance of the steel, but lowers ductility, toughness and corrosion resistance.

It is also possible for such steels to have dual phase austenite-martensite or austenite-ferrite structures in the solubilized and aged state. Such dual phase structures are harmful when present in the solubilized state, since they reduce the hot workability of the steel. When such dual phase structures are present in the solubilized and aged state, they impair mechanical properties of the steel.

As a consequence austenitic steels having better properties, especially for high-temperature applications were needed. Since temperatures of 800°-900° C. and possibly very high temperature gradients, for instance of 150° C., can be present in modern engineering applications, steels were required having good mechanical properties combined with better corrosion resistance, especially at high temperatures, and producible at a reasonable price.

Moreover, it was important that said steels maintain nearly constant in time the improved properties to extend their useful life under such conditions.

Surprisingly it has been found that the simultaneous presence of V, Nb and Mo in specific, well-defined quantities allows to produce an alloy steel showing none of the defects listed above. The object of this invention is to provide an austenitic steel which, owing to the simultaneous presence of Mo, V and Nb in a well-defined concentration range, and together with suitable quantities of C and N, possesses good mechanical properties and also exceptional resistance to high-temperature corrosion, even up to 850° C. and beyond. Another object of this invention is to provide a steel having reasonable production costs, owing to the small quantity of expensive elements in it.

Yet another object of the invention is to provide a steel which maintains aforesaid improved properties nearly constant for a considerable extent of time, thus ensuring long, reliable life for mechanical parts made from it.

Still a further object of the invention is to provide a solubilization and aging treatment for the steel of the invention so that its improved properties can be fully exploited.

The steel according to the present invention is characterized by a composition (in % by weight) comprising the following elements:

0.40–0.65 carbon
0.35–0.60 nitrogen
2.0–3.0 manganese
22.0–24.0 chromium
7.5.–8.5 nickel
0.7–1.3 molybdenum
0.6–1.2 vanadium
0.7–1.5 niobium
up to 0.3 silicon
up to 0.03 sulphur
up to 0.025 phosphorus
balance essentially iron.

A preferred composition (in % by weight) for steel of the invention comprises the following elements:

0.59–0.63 carbon
0.45–0.60 nitrogen
2.0–3.0 manganese
22.0–24.0 chromium
7.5–8.5 nickel
0.8–1.1 molybdenum
0.8–1.1 vanadium
0.8–1.2 niobium
≦0.3 silicon
≦0.03 sulphur
≦0.025 phosphorus
balance essentially iron.

The composition of the steel according to the invention is characterized by a specific ratio among the constituent elements. Particularly, it is characterized by the simultaneous presence in definite quantities of Mo, V and Nb which are linked through a specific ratio to the quantity of C and N present in the alloy. Such specific ratio is expressed by the following mathematical relations, where the elements are expressed in atomic fractions:

(A) $(Nb+V)/(C+N)=0.25–0.45$
(B) $N/C=0.6–1.1$
(C) $V/Nb=0.5–2.0$
(D) $Mo/C=0.15–0.25$.

It has been found that the simultaneous presence of Mo, V and Nb in specific quantities improves the mechanical properties of the steel, such as hardness and creep resistance at low and high temperatures, for instance, it also increases corrosion resistance in oxidizing and sulphurizing atmospheres at high temperatures (about 800°-900° C. and above).

Moreover, the specific ratio linking C and N to said three elements (Mo, V and Nb) results in a steel whose improved properties remain nearly constant for a long time under service conditions. The composition of the steel according to the invention is balanced in order to increase the contribution of each element of the alloy so that the interactions occurring between them, which however are always difficult to foresee, can improve the overall properties of the steel concerned.

To explain the difficulty of a priori prediction of the behaviour of an alloy, U.S. Pat. No. 3,969,109 can be mentioned, in which a possible non-specific addition of some elements selected from Mo, V, Nb and W to the alloy worsened its high-temperature behaviour in oxidizing and sulphidizing atmospheres. (see Table II of cited Patent). Here it has been found that the above elements can be suitably combined so that not only mechanical properties are improved when compared with known composition, but also behaviour of the alloy in aggressive environments and at high temperatures is improved, even in prolonged service conditions, as stated above.

V, Nb and Mo have been combined so that, within the limits of concentration defined by the mathematical relations already given, no dual-phase structures occur in the alloy either in the solubilized or in the solubilized and aged states. The steel according to the invention can be unworked thereby avoiding harmful dual phase structures characterized by anisotropic behaviour in hot deformation and by a tendency to form microcracks and internal defects. The hardening effect results from a specific volume fraction of Nb and V carbides and a Mo fraction present in solid solution so as not to increase the ductility of the material.

The composition so obtained does not give rise to $\sigma$ phase, so the steel according to the invention is stable for a long time under high temperature service conditions, as already mentioned. According to the present invention, in addition to a carefully thought out composition, it is very important to select a suitable, specific solubilizing and aging treatment which ensures the best microstructure for the service requirements of the steel. Solubilizing treatment is performed at a temperature between 1130° and 1230° C. for between 0.2 and 3 hours, the highest treatment temperatures involving the lower time limits of the range indicated, while the longer times referring to treatments at the lower temperatures of the range.

Preferred solubilizing condition is 1170°-1190° C. respectively for 1-0.5 h followed by rapid cooling, preferably water cooling. In the solubilized state, the steel consists of a completely austenitic matrix in which carbides of Nb containing V and carbides of Cr, Mo and V are dispersed.

Aging treatment consists in holding the steel from 0.5 to 40 hours at temperatures of between 870° and 650° C. respectively, followed by air cooling. The preferred condition is: 740°-820° C. respectively for 20-4h. Even more preferable is the 740°-760° C. temperature range for 18-6 hours respectively. During aging precipitation of very fine carbides occurs, which are dispersed in the matrix and on the grain boundaries.

The steel according to the invention is used for those mechanical parts which must work under high continuous mechanical stress in corrosive environments, for instance in oxidizing or sulphidizing atmospheres or the presence of molten salts and at temperatures up to 900° C. and more.

The steel of the invention performs well under test as valves for normally aspirated and supercharged gasoline and diesel engines, precombustion chambers for diesel engines, parts for turbine engines and parts in chemical plants that are subject to high temperature stresses and corrosive environments.

Some characterization test performed on a steel composition as per this invention are outlined in the following tables where the results are compared with those for state-of-the art steels. The results merely provide an indication of the characteristics of the steel of the invention, and should not be considered a limitation on the invention itself.

TABLE 1

| | Compositions (% weight) examined | | | | | | | |
|---|---|---|---|---|---|---|---|---|
| Element | VA 70 * | 033040 ** | 8976 ** | 8975 ** | 8974 ** | 8968 ** | VA 63 *** | VA 62 *** |
| C | 0.60 | 0.35 | 0.40 | 0.41 | 0.33 | 0.40 | 0.53 | 0.72 |
| N | 0.45 | 0.42 | 0.30 | 0.35 | 0.30 | 0.35 | 0.45 | 0.25 |
| Mn | 2.39 | 1.81 | 1.83 | 1.81 | 1.72 | 1.74 | 9.0 | 6.30 |
| Cr | 22.55 | 24.50 | 22.03 | 22.23 | 21.93 | 21.93 | 21.0 | 21.0 |
| Ni | 7.97 | 5.83 | 8.79 | 1.60 | 6.78 | 6.68 | 4.0 | 1.70 |
| Mo | 1.06 | — | — | — | 1.89 | 2.04 | — | — |
| V | 0.99 | — | — | — | — | — | — | — |
| Nb | 1.09 | — | — | 0.29 | 0.29 | — | 1.8 | — |
| W | — | — | — | — | — | — | 0.9 | — |
| Si | 0.27 | 0.29 | 0.50 | 0.53 | 0.57 | 0.57 | 0.3 | 0.6 |
| S | 0.005 | 0.011 | 0.014 | 0.016 | 0.016 | 0.017 | 0.025 | 0.025 |
| P | 0.022 | 0.012 | 0.016 | 0.017 | 0.026 | 0.027 | 0.03 | 0.03 |

* Composition of the present invention
** Composition given for comparison (U.S. Pat. No. 3,969,109)
*** Composition given for comparison

TABLE 2

| | Mechanical properties at room temperature | | | |
|---|---|---|---|---|
| Steel | UTS (MPa) (a) | 0.2% TYS (MPa) (b) | A (%) (c) | Z (%) (d) |
| VA 70* | 1085 | 668 | 20 | 13 |
| 033040** | 1043 | 670 | 15 | 11 |
| 8976** | 971 | 527.5 | 24.5 | 31.8 |
| 8975** | 972 | 534 | 26.5 | 29 |
| 8974** | 1007 | 582 | 24 | 25.5 |
| 8968** | 675 | 449 | n.d. | n.d. |
| VA 63*** | 1070 | 620 | 17 | 16 |
| VA 62*** | 1020 | 610 | 14 | 18 |

*Steel of the present invention
**Steel for comparison (U.S. Pat. No. 3,969,109)
***Steel for comparison
(a) Ultimate Tensile Strength (UTS)
(b) Tensile Yield Strength (TYS)
(c) Percent elongation at rupture (A)
(d) Percent reduction of area at rupture (Z)
n.d. Not determined

TABLE 3

| | Mechanical properties at high temperature | | | | | | | | | |
|---|---|---|---|---|---|---|---|---|---|---|
| | UTS (MPa) (a) | | 0.2% TYS (MPa) (b) | | A (%) (c) | | Z (%) (d) | | Brinell hardness | |
| Steel | 760° C. | 872° C. | 760° C. | 872° C. | 760° C. | 872° C. | 760° C. | 872° C. | 760° C. | 872° C. |
| VA 70 * | 518 | 434 x 350 | 374 | 299 x 260 | 18.5 | 18.9 x 20.0 | 33.4 | 32.7 x 33.0 | 166 | 158 |
| 033040 ** | 472 | 325 | 291 | 223 | 17.9 | 17.1 | 25.8 | 24.4 | 190 | 182 |

* Same meaning as Table 2
** Same meaning as Table 2
(a), (b), (c), (d) Same meaning as Table 2
x Figure obtained at 815° C.

TABLE 4

| Creep strength at 815° C. | |
|---|---|
| Steel | 815° C. (e) |
| VA 70* | 95 |
| 033040** | 85.2 |
| 8976** | 74.5 |
| 8975** | 87.6 |
| 8974** | 84.1 |
| 8968** | 77.2 |

*Same meaning as Table 2
**Same meaning as Table 2
(e) Load for 1% creep in 100 hours at 815° C.

Table 1 sets forth compositions of the steels subjected to mechanical strength and corrosion resistance tests.

VA 70 is the steel according to the present invention

VA 62 and VA 63 are comparative steels because of their high Mn content 033040, 8976, 8975, 8974 and 8968 are numbers related to state-of-the-art steels (U.S. Pat. No. 3,969,109).

Before testing, the steels were treated in the following manner: Solubilization at 1190° C. for one hour, followed by water quenching, then aging at 760° C. for sixteen hours. Table 2 shows the results of mechanical strength properties at room temperature of VA 70, the steel of the invention compared with other steels of different composition. Taken as a whole, the mechanical properties of VA 70 are better than those of the other steels. Only 03340 has similar 0.2 percent TYS while 8976, 8975 and 8974 behave better only as regards ductility at rupture in A and Z tension tests.

Comparison of the high-temperature strengths of VA 70 and 033040 (Tables 3 and 4) shows the worse performance of the latter, only the hardness being better; however, this could be the sign that Type 033040 steels tend to form $\sigma$ phase, as already mentioned, which leads to a rapid decrease of properties.

Table 4 shows the high creep strength of VA 70 compared with the other steel tested.

So, the mechanical strength properties of the steel according to the invention (VA 70), are better than those of other state-of-the-art steels.

Oxidation tests were run by keeping the steel specimens for one hundred hours in a muffle in air atmosphere.

TABLE 5

| Oxidation resistance at 872° C. for 100 hours | |
|---|---|
| Steel | $\Delta g/dm^2$ h |
| VA 70* | 0.147 |
| 033040** | 0.456 |
| 8976** | 0.697 |
| 8975** | 0.718 |
| 8974** | 0.743 |
| 8968** | 0.702 |

TABLE 5-continued

| Oxidation resistance at 872° C. for 100 hours | |
|---|---|
| Steel | $\Delta g/dm^2$ h |
| VA 63*** | 0.171 |
| VA 62*** | 0.646 |

*Same meaning as Table 2
**Same meaning as Table 2
***Same meaning as Table 2

Corrosion tests were run by placing the steel specimens in alumina crucibles. Atmospheres and test conditions adopted were as follows:

(f) Lead oxide: 1h at 913° C.

This simulates the ash formed in internal combustion engines running on leaded gasoline (g) Sodium sulphate 90%+sodium chloride 10% 1 h at 927° C.

This simulates ash formed in diesel engines operating in a marine environment (M) Calcium sulphate 55%, barium sulphate 30%, sodium sulphate 10%, carbon 5%: 1 h at 927° C.

This simulates ash formed in diesel engines (n) Sodium sulphate 85%, vanadium pentoxide 15%: 1 h at 927° C.

This simulates the ash formed in fuels that contain vanadium

The steels tested had been solubilized and aged as described previously, the aging being performed at 760° C. for sixteen hours.

TABLE 6

| Corrosion resistance ($g/m^2 \cdot h$) | | | | |
|---|---|---|---|---|
| Steel | PbO (f) | $Na_2SO_4$ + NaCl (g) | Sulphates + C (m) | $Na_2SO_4$ + $V_2O_5$ (n) |
| VA 70* | 2390 | 51 | 77 | 49 |
| 8976** | 5810 | 240 | 93 | 81 |
| VA 63*** | 2325 | catastrophic | 111 | 74 |
| VA 62*** | 6360 | 31 | 110 | 84 |

*//*/ Same meaning as Table 2

The oxidation and corrosion resistance properties of the steel according to the present invention are overally better than those of known steels.

As can be seen from Table 5, the tests run in different environments simulating use in various kinds of engines reveal that VA 70 has better properties than the other steels. In detail:

in PbO the corrosion rate is slow and would indicate good possibilities for using the steel of the invention for the construction of gasoline engine components in the sodium sulphate/chloride mixture, the rate of corrosion is low; only VA 62 behaves better, the rate being much higher with the other steels. The new steel thus has good possibilities for use in marine diesel engines in the other corrosive environments (mixture of sulphates and carbon, and mixture of sodium sulphate and vanadium pentoxide), though there is no great difference in behaviour of the various steels. VA 70 still performs better than the steels with which it was compared.

To simulate the effect of prolonged high-temperature use of the steel, it was subjected to a temperature of 760° C. for one thousand hours. The influence of this heat treatment on the behaviour of steels subjected to the action of various corrosive environments was thus studied. The results are set forth in Table 7.

TABLE 7

Corrosion resistance of steel specimens held at 760° C. for one thousand hours ($g/m^2 \cdot h$)

| Steel | $Na_2SO_4$ + NaCl (g) | Sulphates + C (m) | $Na_2SO_4 + V_2O_5$ (n) |
|---|---|---|---|
| VA 70* | 48 | 80 | 50 |
| 8976** | 4150 | 86 | 77 |
| VA 63** | 207 | 108 | 62 |
| VA 62*** | 65 | 104 | 80 |

*//*Same meaning as Table 2

We claim:

1. Austenitic steel with improved and long-term constant high-temperature strength and resistance to aggressive agents, [comprising] *consisting essentially of* the following elements in % by weight:

0.40–0.65 carbon
0.35–0.60 nitrogen
[2.0–3.0 manganese]
*about 2.30 manganese*
22.0–24.0 chromium
7.5–8.5 nickel
0.7–1.3 molybdenum
0.6–1.2 vanadium
0.7–1.5 niobium
up to 0.3 silicon
up to 0.03 sulphur
up to 0.025 phosphorus
balance essentially iron, carbon, nitrogen, vanadium, molybdenum and niobium being intercorrelated by specific ratios, said specific ratios being expressed in atomic fractions through the following mathematical relations:

(A) $Nb+V/C+N=0.25–0.45$
(B) $N/C=0.60–1.10$
(C) $V/Nb=0.50–2.0$
(D) $Mo/C=0.15–0.25$.

*2. Austenitic steel with improved and long-term constant high-temperature strength and resistance to aggressive agents, comprising the following elements in % by weight:*

*0.40–0.65 carbon*
*0.35–0.60 nitrogen*
*about 2.39 manganese*
*22.0–24.0 chromium*
*7.5–8.5 nickel*
*0.7–1.3 molybdenum*
*0.6–1.2 vanadium*
*0.7–1.5 niobium*
*up to 0.3 silicon*
*up to 0.03 sulphur*
*up to 0.025 phosphorus*
*balance essentially iron, carbon, nitrogen, vanadium, molybdenum and niobium being intercorrelated by specific ratios, said specific ratios being expressed in atomic fractions through the following mathematical relations:*

*(A) $Nb+V/C+N=0.25–0.45$*
*(B) $N/C=0.60–1.10$*
*(C) $V/Nb=0.50–2.0$*
*(D) $Mo/C=0.15–0.25$.*

* * * * *